(12) United States Patent
Sciammarella et al.

(10) Patent No.: US 6,608,633 B1
(45) Date of Patent: Aug. 19, 2003

(54) VISUAL DISPLAY OF CATEGORICAL INFORMATION THROUGH VISUAL FACTORS SUCH AS SCALE AND LOCATION

(75) Inventors: Eduardo A. Sciammarella, New York, NY (US); Franklin Servan-Schreiber, New York, NY (US)

(73) Assignees: Sony Corporation, Tokyo (JP); Sony Corporation of America, New York, NY (US)

( * ) Notice: Subject to any disclaimer, the term of this patent is extended or adjusted under 35 U.S.C. 154(b) by 0 days.

(21) Appl. No.: 09/183,008

(22) Filed: Oct. 30, 1998

(51) Int. Cl.[7] .................................................. G06F 9/00
(52) U.S. Cl. ........................................ 345/700; 725/46
(58) Field of Search .................. 345/326, 327, 345/328, 335, 337, 1, 700, 716, 723, 744, 764; 348/10, 12, 553, 563, 564, 569, 570, 906; 725/46, 13, 14, 15, 16, 17, 18, 20, 21

(56) References Cited

U.S. PATENT DOCUMENTS

| | | | | |
|---|---|---|---|---|
| 5,390,295 A | * | 2/1995 | Bates et al. ................. 345/340 |
| 5,594,509 A | * | 1/1997 | Florin et al. ................. 348/731 |
| 5,596,373 A | * | 1/1997 | White et al. ................. 348/569 |
| 5,724,521 A | * | 3/1998 | Dedrick .......................... 348/7 |
| 5,737,029 A | * | 4/1998 | Ohkura et al. ................. 725/45 |
| 5,801,747 A | * | 9/1998 | Bedard ............................ 348/1 |
| 5,929,932 A | * | 7/1999 | Otsuki et al. .................. 725/46 |
| 6,002,394 A | * | 12/1999 | Schein et al. ................. 345/327 |
| 6,029,176 A | * | 2/2000 | Cannon ........................ 707/104 |
| 6,133,909 A | * | 10/2000 | Schein et al. ................. 345/327 |
| 6,151,059 A | * | 11/2000 | Schein et al. .................. 348/13 |

\* cited by examiner

Primary Examiner—Cao (Kevin) Nguyen
(74) Attorney, Agent, or Firm—Blakely, Sokoloff, Taylor & Zafman LLP (57) ABSTRACT

A method and structure for the display of categorical information on a display screen utilizes visual factors such as scale and location to express the degree of importance of a particular category over other categories of categorical information with respect to a selected measurement value. Categorical information is displayed primarily based on the selected measurement value of volume of programming or frequency of use at any given time.

46 Claims, 11 Drawing Sheets

VISUAL DISPLAY OF CATEGORICAL INFORMATION THROUGH VISUAL FACTORS SUCH AS SCALE AND LOCATION

CROSS-REFERENCE TO RELATED APPLICATIONS

The subject matter of the present application is related to U.S. application Ser. No. 08/183,010, now U.S. Pat. No. 6,133,962 and U.S. application Ser. No. 09/183,525, both filed contemporaneously with this application, assigned to Sony Corporation and to Sony Electronics, which are hereby expressly incorporated herein by reference.

FIELD OF THE INVENTION

This invention relates generally to the display of information on display screens, and more particularly to the display of categorical information on display screens, utilizing visual factors to express the relative degree of importance of the categorical information. The invention is particularly applicable to the fields of television programming and related computer information display in the fields of terrestrial, cable, satellite or other distribution of video programming.

BACKGROUND OF THE INVENTION

Various methods of displaying visual information on visual display screens, such as computer monitors and television screens, are well known in the art. Since the intent of a visual display is to convey information to the viewer of the display, various formats have evolved which are considered efficient when used for the display of particular types of visual information. For example, movies on television are generally presented using a full screen format, whereas temperature data for cities around the country are usually presented in a list format. Hybrid examples are also common, such as the full screen presentation of a sports event with the score and other numeric data of interest occupying a small area of the screen. Computer program data is commonly presented in a list, table, or matrix format and handheld remote controls and many computer programs utilize interactive menus and dropdown lists in combination with icon symbols.

Figure 1:
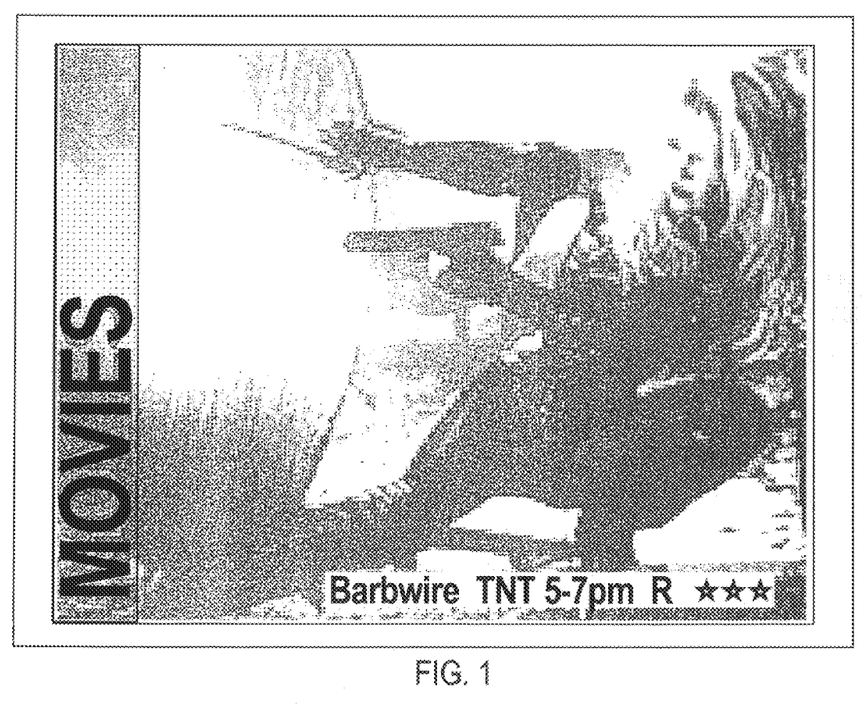
FIG. 1 illustrates a movie program and textual and numerical information concerning the movie program that is displayed on a display screen, according to the prior art.

The display of television programs and related information on television screens for terrestrial, cable, satellite and other video distribution systems can be divided into two types: the display of program pictures and the display of textual and numerical information. FIG. 1, for example, shows the display of a movie program on a display screen as well as the display of textual and numerical information relating to the program, "Barbwire TNT 5–7 pm R ***" in the bottom right corner of the screen. This type of information has in general been presented to the viewer in picture-in-picture, list, or grid arrangements on the display screen, according to the best manner to present the information to the viewer. Differentiation between information, such as between categories and associated subcategories, is typically accomplished by switching the images displayed on the screen or by changing the size and color of the textual and numerical information displayed. A category of information refers to a particular type of information having an identifying characteristic by which it can be identified and thus sorted from other categories of information. Thus, referring again to television programming as an example, types of categories might include sports, news, children, shopping, movies, and educational programs; subcategories of the category of sports, for example, might include baseball, football, basketball, soccer, hockey, tennis, and boxing.

While these methods are sufficient for displaying images and text and/or numerical information, there is currently no method in the art for displaying information indicative of the volume of programming or the frequency of use of the information displayed on the display screen. There is thus currently no mechanism by which the frequency of certain categories of information is displayed on the display screen, i.e. the "frequency of use", or the portion of all information that is displayed on the display screen over a given period of time that is devoted to a certain category of programming, i.e. the "volume of programming", is visually presented to the viewer of the display screen.

As an example, consider a satellite system that provides television programming to viewers. Several categories of programming may be viewed by the viewer, including sports, news, movies, shopping, children, and educational programs. While certain information about a particular program, such as the type or category of the program, the description of the program, and the start/stop time of the program, may be readily available, the viewer does not have access to other information. The viewer does not have access to visual frequency of use information, such as how often certain categories of programming, like movies, are viewed by the viewer over other types of programming, like news. Nor is the viewer visually provided with volume of programming information.

Suppose, for instance, that the viewer wishes to know the relative volume of programming of the various subcategories of a category of programming, such as sports. The viewer may wish to know what volume of sports programming is devoted to various subcategories of sports, like baseball, football, basketball, soccer, hockey, tennis, and boxing. Is 50% of all sports programming devoted to baseball, football, and basketball? Does boxing only account for 5% of all sports programming? This type of volume of programming information is not readily and visually provided to the display screen viewer. Often the arrangement of categories and subcategories is in the form of an alphabetical list, with no concern whatsoever given to volume of programming and frequency of use information. Such systems that do not display the volume of programming or frequency of use information have no value without the display screen, which is the sole visual interface with the viewer. This is especially true for computer monitor displays which may have no audio channel. It is therefore critical that a maximum amount of visual information be provided to the viewer through the display screen.

In light of the above discussion, it is clear that there exists a need in the art to be able to provide a maximum amount of visual information to a viewer of a display screen. In particular, there is a need to display information concerning volume of programming or frequency of use information to the viewer in a visual manner.

SUMMARY OF THE INVENTION

It is accordingly an object of the invention to be able to provide maximum visual information about categorical information being displayed on a display screen.

According to the present invention, a method and structure provides for the display of categorical information which utilized scale and location of displayed information to express the degree of importance of the information being displayed to a viewer of the information vis-à-vis other information being displayed. A measuring value, such as a volume of programming value or a frequency of use value, is typically selected. The measuring value may be selected by the viewer through appropriate manipulation of a user interface, such as a remote control device of an audio/visual system (AV) or a graphical user interface (GUI) of a computer-based system, or it may be set by a computer program in communication with the user interface that operates to determine the relative degree of importance of the categorical information and display it on the display screen. After the measuring value has been selected, a plurality of categories is displayed on the display screen by the computer program so as to indicate visually to the viewer through one or more visual factors, such as scale and location, the relative importance of each of the categories of the plurality of categories as measured by the measuring value. The computer program further operates to update the categorical information displayed on the display screen, in response to any changes detected in the selected measuring value. The present invention is also applicable to the display of subcategories of one or more the categories.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention is a method and structure for the display of categorical information on a display screen, utilizing scale and location to express the degree of importance of a particular category over other categories of categorical information with respect to a selected measurement value. The present invention displays categorical information primarily based on the selected measurement value of volume of programming at any given time but may also display categorical information based upon the measurement value of frequency of use of programming categories. Considering first the display of categorical information based upon the selected measurement value of volume of programming, consider the following example. At 6:00 p.m. the largest category of programming available is the "news" category, larger than the other categories of movies, sports, shopping, children, and educational programs, etc., whereas at 10 p.m. the largest category of programming is "movies." At 6:00 p.m., then, the "news" category will be visually displayed as the physically largest category, having a scale and location that is indicative of its larger volume of programming status than the other categories. At 10 p.m., "news" will no longer be displayed as the largest and most prominently placed category since the "movies" category now represents the largest volume of programming category available for viewing by the viewer of the display screen. The communication of a system necessary to display volume of programming information would include the communication between a computer program, the user interface, and the program data delivered via a network of the system.

The present invention also is capable of displaying categorical information based on the measurement value of frequency of use of certain categories by the viewer. Frequency of use information is specific to a particular viewer. Thus, viewer 1 may have certain programming preferences that are different from those of viewer 2, and the display of frequency of use information will therefore be different for view 1 and view 2. Scale and location can be used to visually represent the frequency of use to the viewer. For instance, if the viewer generally watches more sports than news and more news than movies, then the sports category will be displayed as a physically larger category than the news category and the news category will in turn be displayed as a physically larger category than the movie category. This is an example of communicating the frequency of use information to the viewer through scaling the categorical information. The strategic placement and location of various categories on the display screen can also be used to communicate frequency of use information to the viewer. Continuing with the above example, the sports category would be displayed in a position of more importance than the news category which is in turn displayed more prominently than the movie category. For instance, the sports category may be displayed first in a list followed by the news and movie categories, in that order. The location of the sports category prior to the news category in such a manner indicates that sport programs are watched more frequently than are news programs. Displaying frequency of use can be done by simply by communication between the user interface and a computer program that tracks the frequency of use.

The display of volume of programming and frequency of use categorical information is capable of changing dynamically to reflect any changes in this information in "real time" as they occur. The cursor that is used by the viewer to tab through categories is able to move and scale smoothly between the categories being displayed. The physical layout of categories in the two-dimensional display screen allows the viewer to easily select the desired choice.

In addition to volume of programming and frequency of use, other measuring values may be used in conjunction with the present invention. The measuring value may be a predetermined user selection that the user can select through the user interface, whether it be via a remote control of an AV system or via a mouse of a computer-based system, or it may be the time of day, etc.

Figure 2:
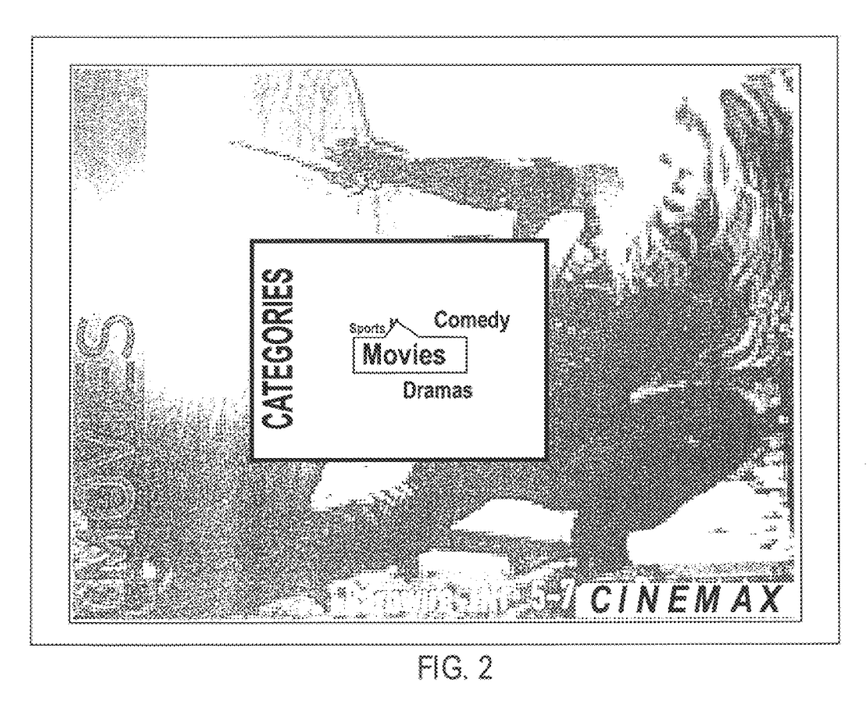
FIG. 2 illustrates an interface box containing categories of programming information in which the relative importance of the categories with respect to a measuring value through the use of scaling and location, according to the present invention.

The present invention is further illustrated in FIGS. 2–8. In FIG. 2, a movie program, the movie "Barbwire", is being displayed on a display screen. Overlaying the image of the movie is an interface box, labeled "CATEGORIES," that is a graphical user interface (GUI) that visually presents the categories of television programming currently available on the display screen in a manner that indicates the relative importance of the various categories with respect to a measuring value through the use of scale and location. The measuring value, whether it be volume of programming, frequency of use, time of date, or some predetermined value selected by the user, may be previously selected by the viewer through appropriate manipulation of the GUI of the interface box or it may be set to be either volume of programming or frequency of use through a computer program that drives the GUI.

Figure 9:
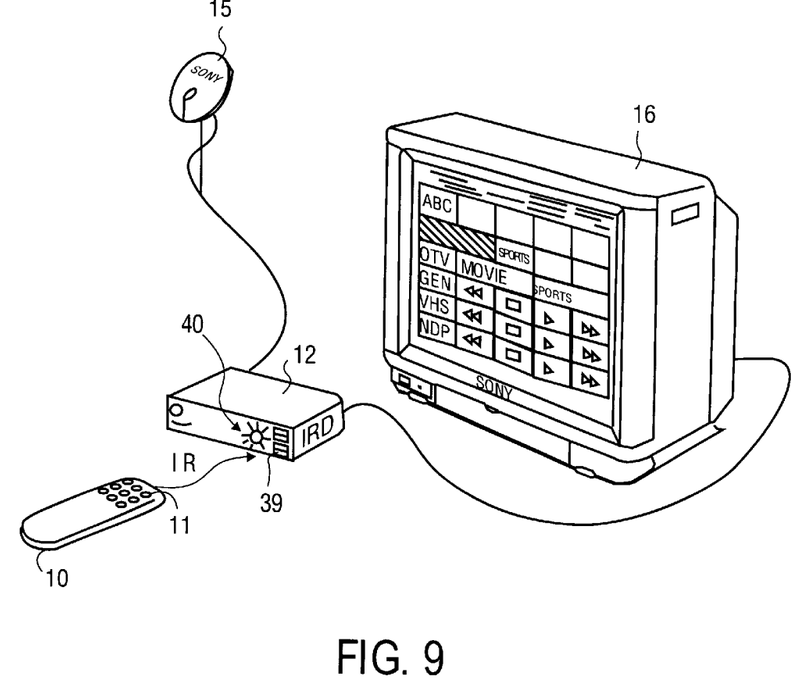
FIG. 9 illustrates a sample audio/visual (AV) system for use in conjunction with the present invention.

The computer program is run by a system, such as a personal computer (PC) system or an audio/visual (AV) system, that is operatively coupled to the display screen to form a semantic category display system that comprises the display screen and the computer or AV system with the computer program. The viewer communicates with the computer program by selecting the desired options by employing the point and click function of a mouse, in the case of a PC system, to accurately position a cursor in the interface box and select the desired options, or by using a remote control to select the desired options in audio/visual (AV) display system, in the case of an AV system implementation. A typical AV system implementation using a remote controller is shown in FIG. 9 The use of a mouse, or other point and selection mechanisms, or a remote control device in conjunction with a GUI is well known. Once the computer program receives the measuring value selected by the viewer, it operates to visually present information to the viewer concerning the various categories by the scale and location that it accords to each of the categories displayed within the interface box.

Figure 3:
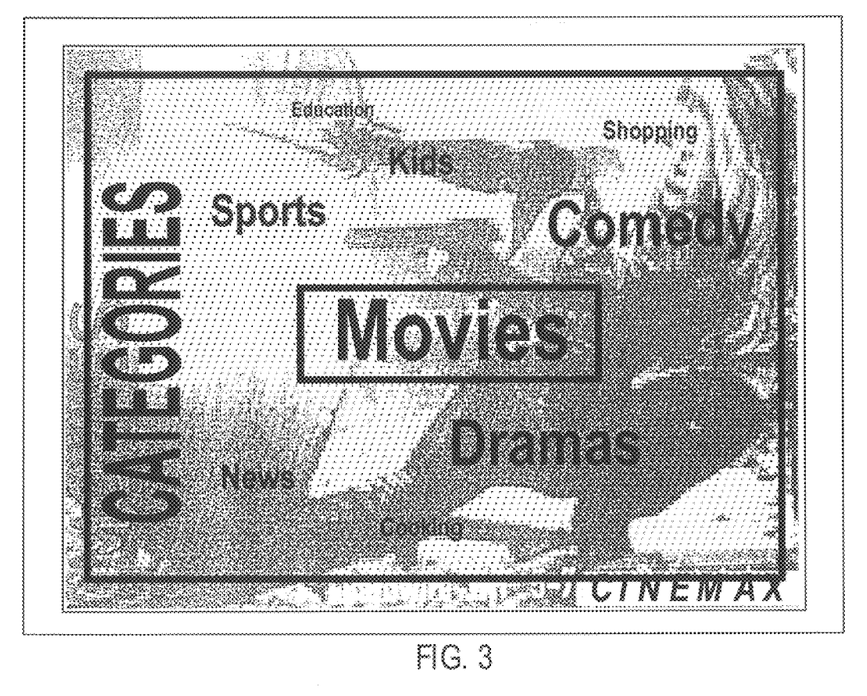
FIG. 3 illustrates the interface box of FIG. 2 in which a first category is selected, according to the present invention.

In the GUI of FIG. 3, the categories of "Movies," "Comedy," "Dramas," "Sports," "News," "Kids," "Cooking," "Shopping," and "Education" are shown. Both scaling and location of the categories are used to illustrate in a visual way the relative importance of each of the categories vis-à-vis the other categories with, respect to a selected measuring value. Consider that the selected measuring value is volume of programming. The arrangement of the various categories within the interface box indicates that the category "Movies" has the highest volume of programming at the present time, meaning that as a volume of the total programming available to the viewer there are more movies available for viewing than any other category of programming. The "Movies" category is the category having the largest typeset, i.e. scale, and it is also the category having the prominent, center location within the interface box, i.e. location, at the present time. The categories "Comedy" and "Dramas" appear to be tied for the next-highest volume of programming status; they therefore have the next-largest text typeset and are located the closest to the center of the interface box. This indicates that after movies, there are more comedies and dramas available for viewing than any of the other categories at the present time. The "Sports" category appears to have the next-largest volume of available programs for viewing followed by "Kids" and "News" which appear to have approximately the same volume of programming available at the present time; again, note that the categories "Kids" and "News" have smaller typeset and a more remote location than does the "Sports" category. "Cooking" and "Shopping" are next, followed by the smallest and most remote category "Education." It appears that the "Education" category has the least amount of available programs for viewing by the viewer of any of the categories.

Now suppose that the viewer had selected frequency of use as the measuring value. In this case, the scale and location of the categories within the interface box would still indicate the "Movies" category as the most important category and "Education" as the least important category but the scale and location are now indicative of the frequency of use, not the volume of programming. Thus, the most-frequency watched to least-frequency watched categories would be, in descending order, as follows: "Movies," "Comedy" and "Dramas," "Sports," "News" and "Kids," "Cooking" and "Shopping," and "Education." This arrangement of the categories by scale and location indicates that this particular viewer watches more movies than any other category and less educational programming than any other category of programming.

It is important to note that while FIGS. 2 and 3 show the use of both scale and location to indicate the relative importance, or unimportance, of a particular category vis-à-vis other categories, it is not necessary to use both of these visual factors to visually communicate the categorical information to the viewer. For example, scale alone could be used to indicate the relative importance of each of the categories. In this case, the "Movies" category would still be considered the most important category as it has the largest text and the "Education" category, with the smallest text, would be considered the least important category. Conversely, the computer program could use only strategic placement of the categories in different locations within the interface box to relative importance with respect to the selected measuring value. In this instance, perhaps the category that is placed nearest the top of the interface box would be the most important category and the category that is placed nearest the bottom of the interface box would be the least important category, regardless of the scale of the category names themselves.

Figure 4:
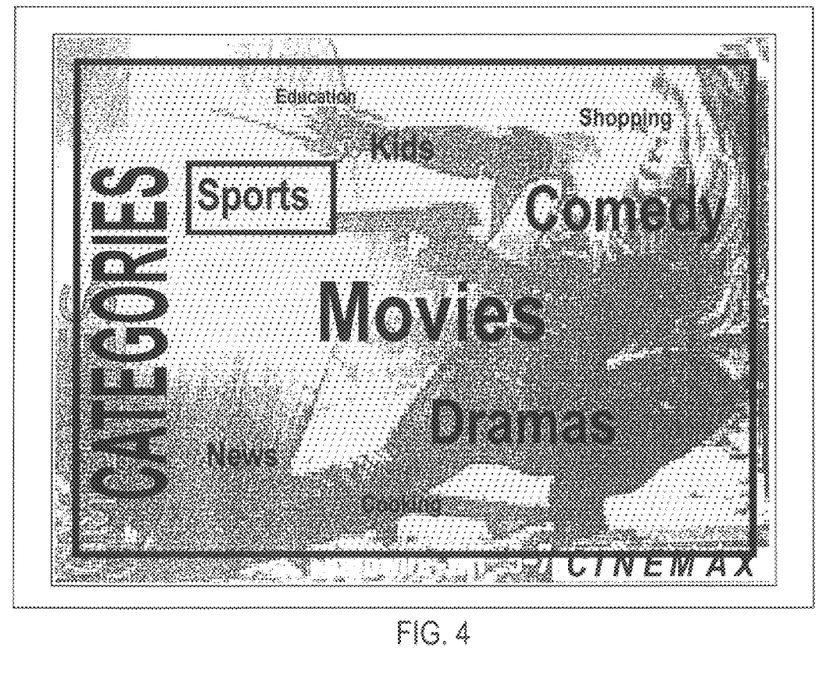
FIG. 4 illustrates an interface box of FIG. 2 in which a second category is selected, according to the present invention.
Figure 5:
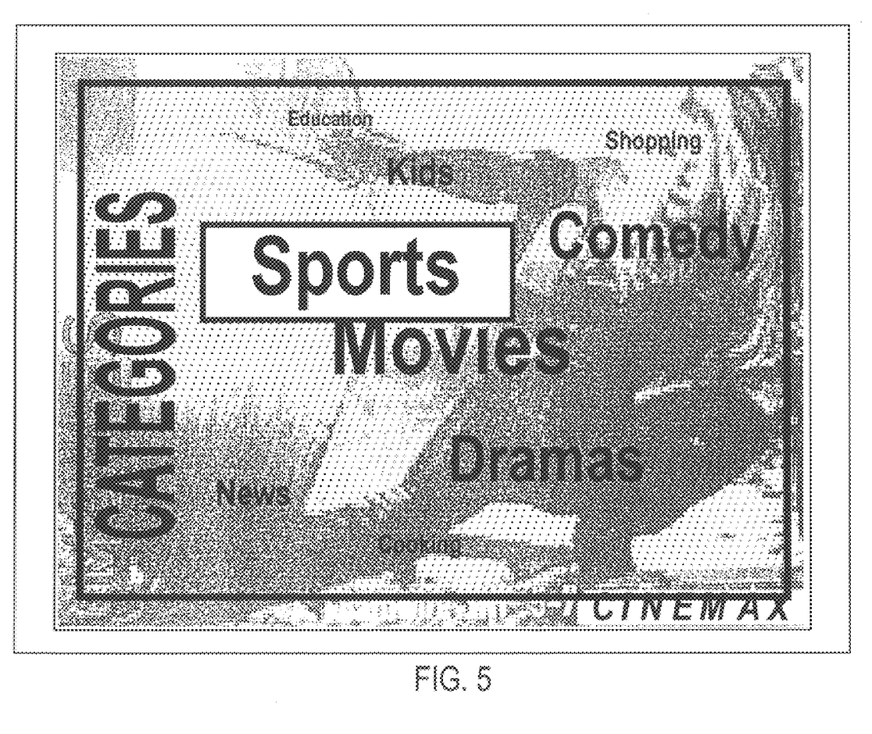
FIG. 5 illustrates the interface box of FIG. 4 in which the second category has been selected to be opened, according to the present invention.
Figure 6:
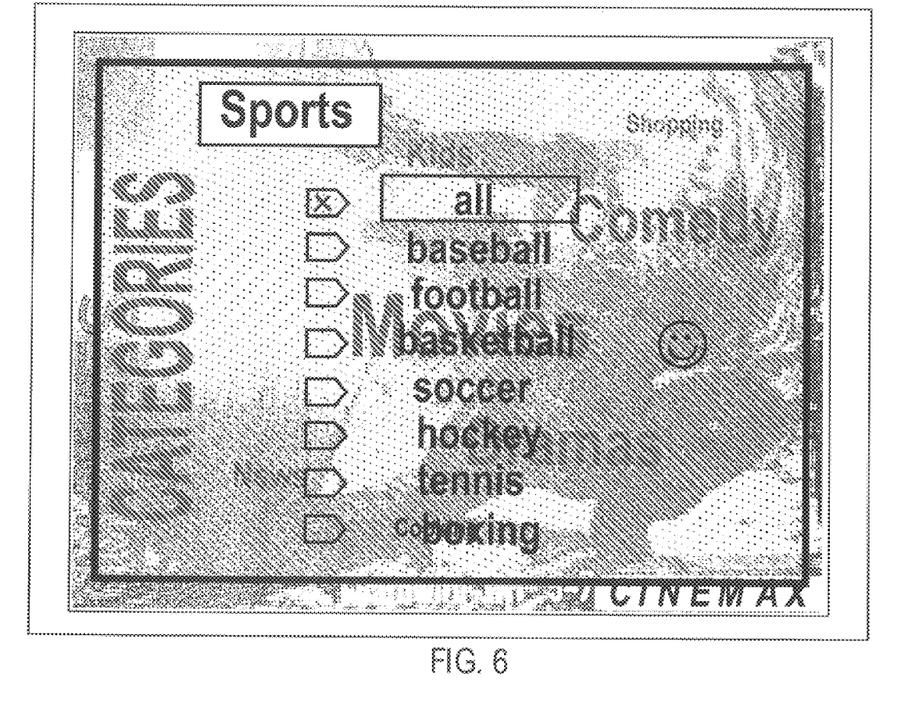
FIG. 6 illustrates the interface box of FIG. 5 in which a plurality of subcategories of the second category are displayed and one of the subcategories is selected, according to the present invention.
Figure 7:
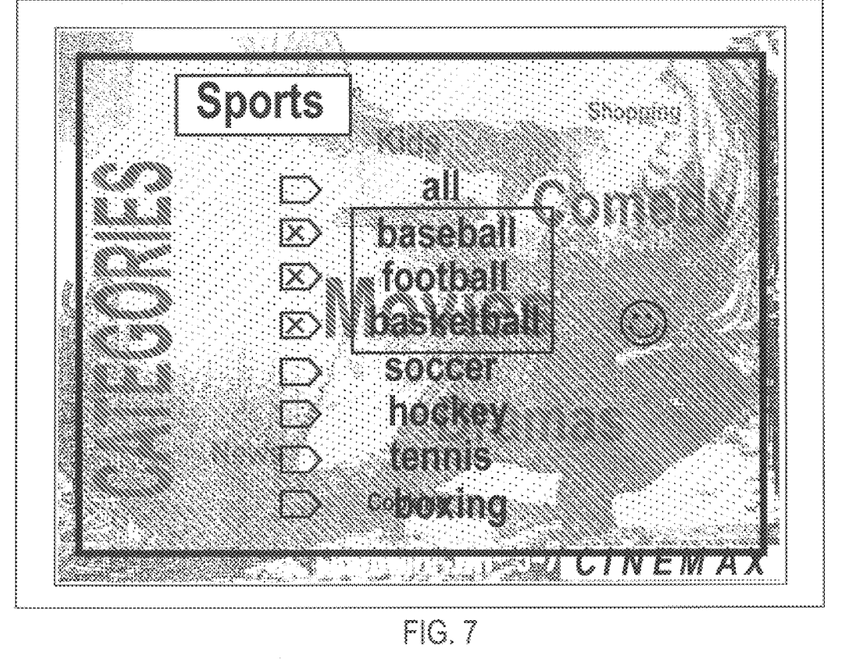
FIG. 7 illustrates the interface box of FIG. 6 in which three of the subcategories of the second category are selected, according to the present invention.

As shown in FIG. 3, the viewer has selected the "Movies" category, most probably with judicious manipulation of a mouse or a remote control, as indicated by the white box that surrounds the category. In FIG. 4, the viewer has selected the "Sports" category. The viewer can open up the "Sports" category to reveal subcategories of the "Sports category. In FIG. 5, the viewer has decided to open up the "Sports" category as indicated by its enlarged box; the viewer most probably opened the "Sports" category by double-clicking the select button of the mouse or selecting the appropriate button of a remote control device. Referring to FIG. 6, the subcategories of the "Sports" category are displayed: "all," "baseball," "football," "basketball," "soccer," "hockey," "tennis," and "boxing." The "all" subcategory has been selected by the viewer as indicated by the checked arrow preceding the "all" subcategory and the white box surrounding the "all" subcategory. In FIG. 7, three other subcategories, "baseball," "football," and "basketball," have been selected by the viewer. For each of the subcategories selected, information concerning volume of programming and frequency of use can be provided to the viewer, in the same manner that this information for categories is provided to the viewer.

Figure 8:
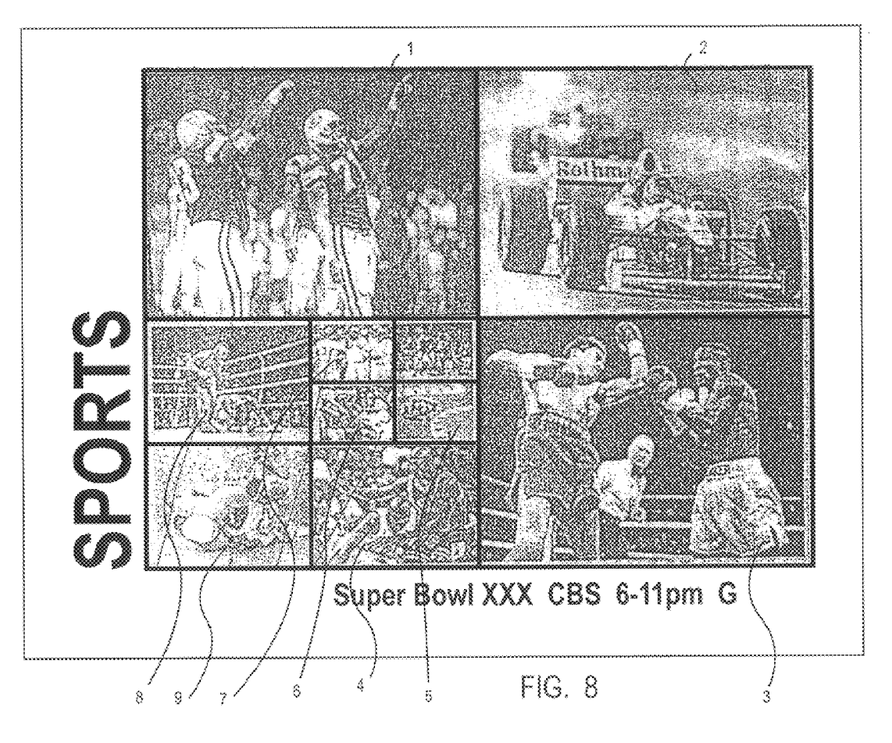
FIG. 8 illustrates the relative importance of nine subcategories relative to a selected measuring value through the use of scaling, according to the present invention.

The visual factors of scale and location can be used to display visual information about categories and subcategories of information that are identified by textual information. As shown above in FIGS. 2–5, the arrangement of the names of categories according to the factors of scale and location indicates the relative importance of the categories. In addition, the factors of scale and location can be applied to the visual representation of categories and subcategories as well. As shown in FIG. 8, various subcategories of the category "Sports" are shown. The subcategories appear to be the various sports programs that are available for viewing at this time. For instance, the nine subcategories include football, racing, boxing, baseball, and basketball programming. It will be noted that the different subcategories of sports are represented in boxes of differing sizes; scale is used to distinguish the relative importance of the subcategories. In this example, subcategories 1, 2, and 3 are the most important subcategories with respect to the selected measuring value, whether it be length of program, frequency of use, etc., since they are the largest and are approximately equal in size. Next, subcategories 4, 8, and 9 are the next-most important followed by subcategory 5. The least-important subcategories are 6 and 7 because they are the smallest within the interface box.

As previously mentioned, the present invention may be implemented by either a computer system that uses a mouse as a control mechanism for controlling the GUI or an audio/visual (AV) system having a remote control for controlling the GUI. FIG. 9 illustrates a representative audio/visual (AV) system capable of implementing the present invention. The AV system of FIG. 9 is a simplified diagram of a Direct Satellite System (DSS). The system has a remote controller 10 with data buffer 11, an integrated receiver/decoder 12 (IRD), commonly referred to as a "set-top box," an antenna 15, and a monitor 16. Packets of data are transmitted by a transponder of the satellite, with each transponder transmitting data in a time share manner at a predetermined frequency. A tuner of the IRD, shown as 21 of FIG. 10, is tuned to the frequency of the transponder corresponding to a channel designated by a viewer of the system and packets of digital data of that channel are received by the IRD 12.

Antenna 15 receives an encoded data signal sent from a satellite and the encoded data signal is decoded by IRD 12. Low noise block down converter 15a (LND) of antenna 15 converts a frequency of a signal sent from the satellite to another frequency. The converted signal is supplied to IRD 12 which in turn supplies a signal to monitor 16.

Figure 10:
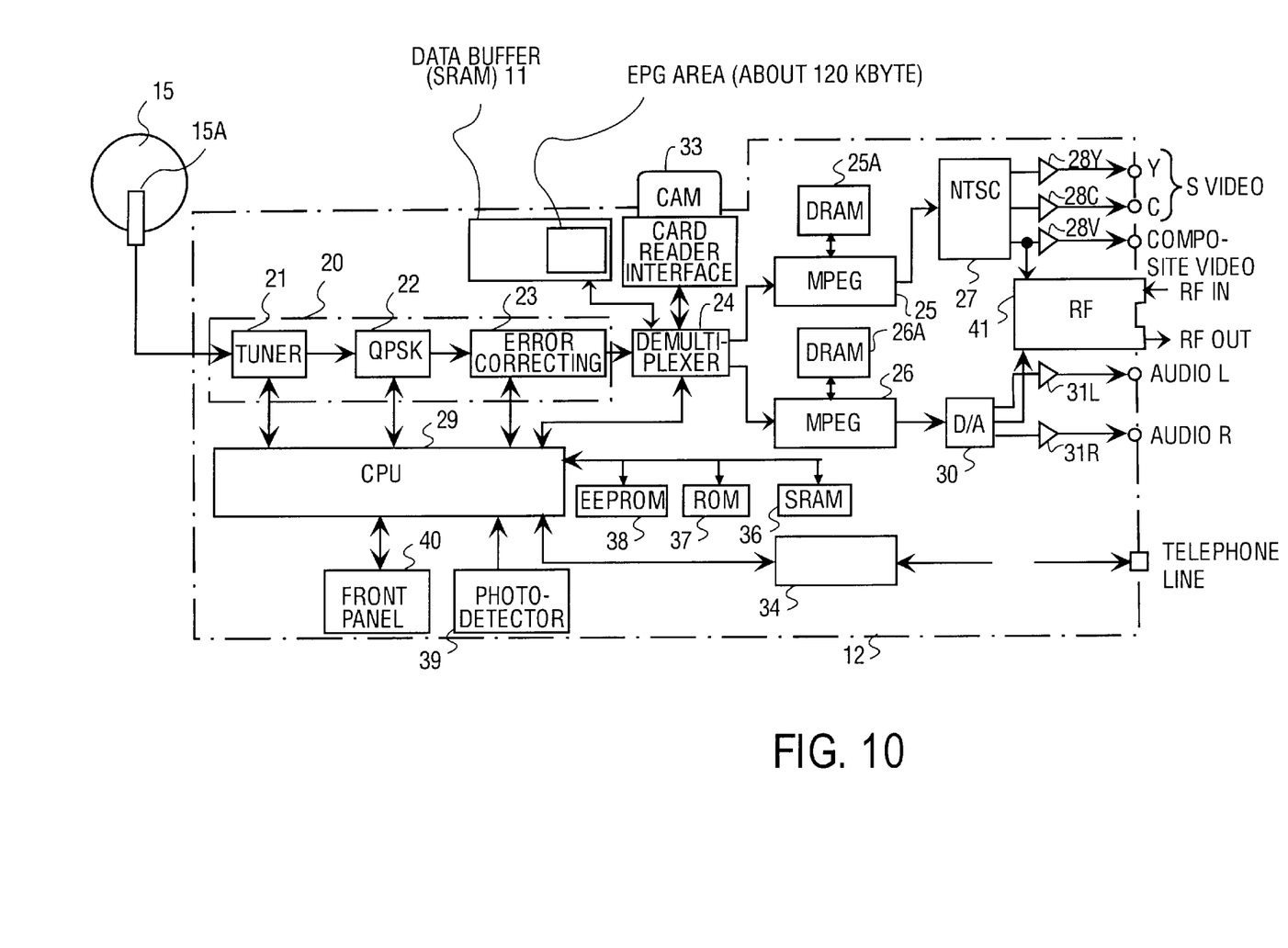
FIG. 10 illustrates a block diagram of the integrated receiver/decoder illustrated in FIG. 9.

FIG. 10 illustrates a block diagram of IRD 12. A radio frequency (IR) signal output from LNB 15a of antenna 15 is supplied to a tuner 21 of a front-end block 20. The output from tuner 21 is supplied to a quadrature phase shift keying (QPSK) demodulation circuit 22 for demodulation. The output from QPSK demodulation circuit 22 is supplied to an error correcting circuit 23 for error correction. The data is received in encrypted and encoded, i.e. compressed, form.

Demultiplexer transport IC 24 stores the data stream, consisting of packets of data, received from error correcting circuit 23 of block 20 and directs portions of the data stream to the appropriate circuit for processing. The digital data stream sent from a satellite includes headers for classifying the different portions of the data in the digital data stream. The transport IC 24 stores the headers in registers and uses the headers to direct data. The data stream sent from the satellite, includes video data in the format specified by the Motion Pictures Expert Group standard (MPEG), MPEG audio data and electronic programming guide (EPG) data. Data, that is identified by its header to be video data is transferred to MPEG video decoder 25. Data that is identified by its header to be audio data is transferred to MPEG audio decoder 26. Data that is identified to be EPG data is transferred to an area of data buffer 11 of the remote controller 10 that stores the EPG data.

Conditional access module (CAM), which typically includes a central processing unit (CPU), a read-only memory (ROM), and a random access memory (RAM), determines whether the user has the authorization to receive certain data, such as access to a pay TV station, using the authorization information stored in its memory. If the CAM determines that the user has the proper authorization for access, a key to decrypt the incoming data is provided to transport IC 24 which decrypts the data using the, provided key. A smart card containing the key may be utilized, in which case the smart card is inserted into card reader interface 32.

The MPEG video and audio decoders, 25 and 26, respectively, each have a dynamic random access memory (DRAM). 25a and 26a that is used for buffering and storing data during processing by the associated decoder. The decoded digital video signal is supplied to a National Television System Committee (NTSC) encoder 27 and converted to a luminance signal (Y) and a chroma signal (C) output by buffer amplifiers 28Y and 28C, respectively, as an S video signal. A composite video signal is output through buffer amplifier 28V as shown. The decoded digital audio signal is converted into an analog audio signal by D/A converter (DAC) 30 which outputs the left audio signal through buffer amplifier 31L and the right audio signal through buffer amplifier 31R. RF modulator 41 mixes the composites video signal with an analog audio signal and converts the mixed signal into an RF output signal.

CPU 29 is the central control mechanism of IRD 12. It executes instructions stored preferably in ROM 37 in order to perform certain system functions. For example, CPU 29 receives and processes user inputs received from front panel buttons or switches 40 of IRD 12 and the photodetector circuit 39 to provide requested user functionality and access. CPU 29 also accesses user settings and preferences, stored in non-volatile memory (NVM) such as electrically erasable programmable read-only memory (EEPROM) 38, for processing of information and configuration of the system.

Figure 11:
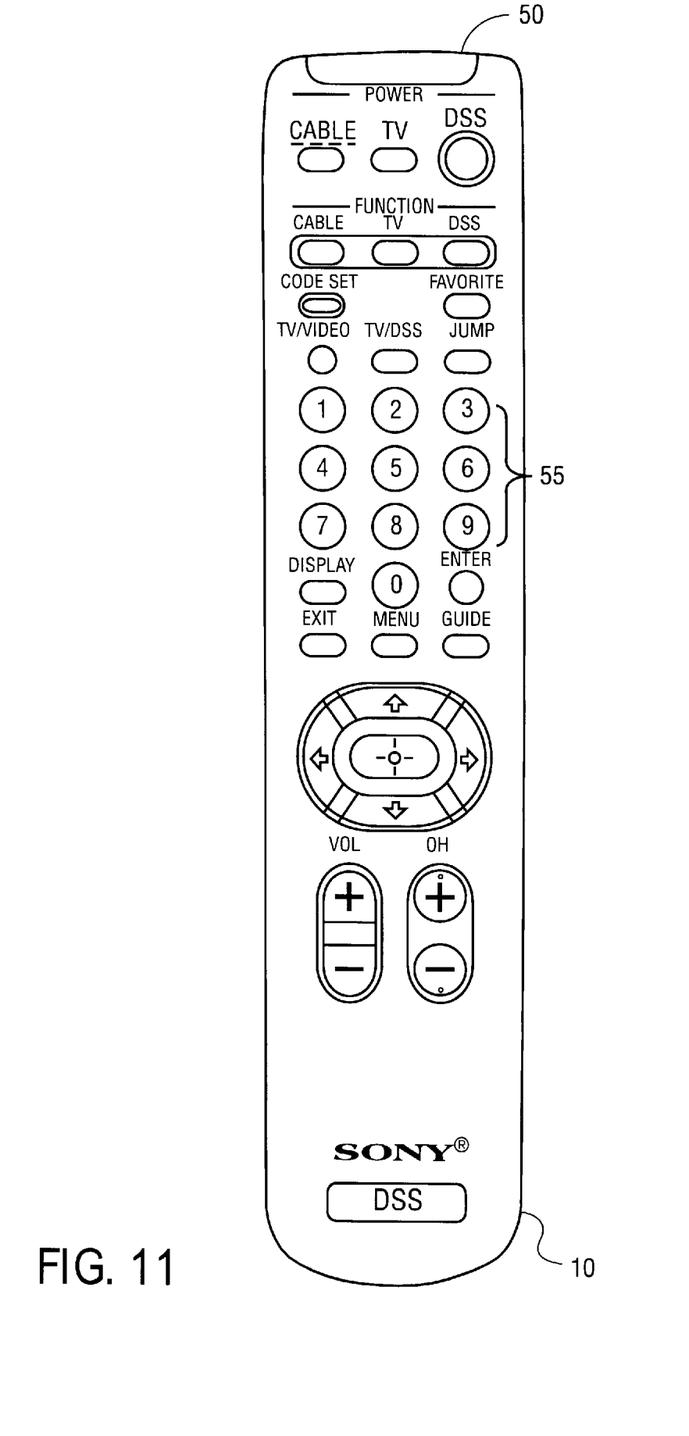
FIG. 11 illustrates a representative remote controller shown in FIG. 9.

FIG. 11 shows a representative remote controller 10. Remote controller 10 is utilized by a user to transmit commands and make program selections in accordance with the teachings of the present invention. Remote controller 10 has an infrared (IR) originating device 50, a set of operation buttons that are controlled by the user 55, a CPU, a ROM, and a RAM, not shown here. Operation buttons 55 include a direction key for pointing the cursor in a horizontal or a vertical direction, a "SELECT" key, a "MENU" key, a "FAVORITE" key, an "EXIT" key; a ten-key alpha-numeric pad, an "ENTER" key, and other function keys known in the art. The CPU of remote controller 10 receives a signal when a user presses an operation button 55 and processes the signal in accordance with a program stored in ROM. The RAM is controlled by the CPU to produce a transmitting code that is sent to IR originating device 50 where it is converted to an IR signal. The IR signal is then transmitted to IRD 12.

The present invention uses visual factors, such as scale and location, in order to visually express the relative importance of categorical information with regard to a selected measuring value, like volume of programming and frequency of use, on a display screen. To that end, the present invention has application in any environment or application in which a visual factor can be a useful measure of important categorical information. For instance, the present invention could be used to display frequently used applications on a computer system or the volume of users in a chat room on the Internet.

While the invention has been particularly shown and described with reference to a preferred embodiment, it will be understood by those skilled in the art that various changes in form and detail may be made therein without departing from the spirit and scope of the invention.

What is claimed is:

1. A method for visually displaying the relative importance of categorical programming information on a display screen, said method comprising:

receiving a selection of a measuring value; and displaying titles of a plurality of programming categories on a display screen in a manner that visually indicates to a viewer of the display screen through one or more visual factors the relative importance of each of the programming categories of the plurality of programming categories as measured by the measuring value, said one or more visual factors being size and location.

2. The method of claim 1, wherein the selection of the measuring value is received from a user interface in communication with a computer program that sets the measuring value.

3. The method of claim 1, wherein the selection of the measuring value is received from a computer program that sets the measuring value.

4. The method of claim 1, wherein the titles of the plurality of programming categories are presented in an interface box within the display screen.

5. The method of claim 4, wherein the interface box is a graphical user interface (GUI) by which the viewer of the display screen is in communication with the computer program.

6. The method of claim 1, wherein the titles of the plurality of programming categories are displayed on the display screen by a computer program that determines the relative importance of each of the programming categories of the plurality of programming categories as measured by the measuring value.

7. The method of claim 1, further comprising:

updating the one or more visual factors through which the titles of the plurality of programming categories are displayed on the display screen in response to a change in the selected measuring value.

8. The method of claim 1, wherein the titles of the plurality of programming categories are displayed within an interface box on the display screen that is a graphical user interface (GUI) by which the viewer of the display screen is in communication with a computer program that determines the relative importance of each of the programming categories of the plurality of programming categories as measured by the measuring value and displays the titles of the plurality of programming categories within the interface box.

9. The method of claim 1, further comprising:

receiving a selection of a programming category of the plurality of programming categories; and displaying titles of the plurality of programming subcategories on the display screen in a manner that visually indicates to a viewer of the display screen through one or more visual factors the relative importance of each of the programming subcategories of the plurality of programming subcategories as measured by the measuring value.

10. The method of claim 9, wherein the titles of the plurality of programming subcategories are presented in an interface box within the display screen.

11. The method of claim 10, wherein the interface box is a graphical user interface (GUI) by which the viewer of the display screen is in communication with the computer program.

12. The method of claim 9, wherein the titles of the plurality of programming subcategories are presented on the display screen by a computer program that determines the relative importance of each of the programming subcategories of the plurality of programming subcategories as measured by the measuring value.

13. The method of claim 9, wherein the titles of the plurality of programming subcategories are displayed within an interface box on the display screen that is a graphical user interface (GUI) by which the viewer of the display screen is in communication with a computer program that determines the relative importance of each of the programming subcategories of the plurality of programming subcategories as measured by the measuring value and displays the titles of the plurality of programming subcategories within the interface box.

14. The method of claim 9 further comprising:

displaying content for the plurality of programming subcategories on the display screen in a manner that visually indicates the relative importance of each of the programming subcategories.

15. The method of claim 1 further comprising:

displaying content for the plurality of programming categories in a manner that visually indicates the relative importance of each of the programming categories.

16. A semantic category display system, comprising:

a display screen; and a computer system, having a computer program, that is operatively coupled to the display screen, wherein titles of a plurality of programming categories are displayed on the display screen in a manner that visually indicates to a viewer of the display screen through one or more visual factors the relative importance of each of the programming categories of the plurality of programming categories as measured by a measuring value and as determined by the computer program, said one or more visual factors being size and location.

17. The system of claim 16, wherein the measuring value is set through a user interface displayed on the display screen that is in communication with the computer program.

18. The system of claim 16, wherein the measuring value is set by the computer program.

19. The system of claim 16, wherein the titles of the plurality of programming categories are presented in an interface box within the display screen.

20. The system of claim 19, wherein the interface box is a graphical user interface (GUI) by which the viewer of the display screen is in communication with the computer program.

21. The system of claim 16, wherein the computer program operates to update the one or more visual factors through which the titles of the plurality of programming categories are displayed on the display screen in response to a change in the measuring value.

22. The system of claim 16, wherein content for the plurality of programming categories is displayed in a manner that visually indicates the relative importance of each of the programming categories.

23. A storage media containing a computer program for visually displaying the relative importance of categorical programming information on a display screen, comprising:

instructions for setting a measuring value; and instructions for displaying titles of a plurality of programming categories on a display screen in a manner that visually indicates to a viewer of the display screen through one or more visual factors the relative importance of each of the programming categories of the plurality of programming categories as measured by the measuring value, said one or more visual factors being size and location.

24. The media of claim 23, further comprising:

instructions for updating the one or more visual factors through which the titles of the plurality of programming categories are displayed on the display screen in response to a change in the measuring value.

25. The media of claim 23, further comprising:

instructions for receiving a selection of a programming category of the plurality of programming categories; and instructions for displaying titles of the plurality of programming subcategories on the display screen in a manner that visually indicates to a viewer of the display screen through one or more visual factors the relative importance of each of the programming subcategories of the plurality of programming subcategories as measured by the measuring value.

26. The media of claim 25 further comprising:

instructions for displaying content for the plurality of programming subcategories in a manner that visually indicates the relative importance of each of the programming subcategories.

27. The media of claim 23 further comprising:

instructions for displaying content for the plurality of programming categories in a manner that visually indicates the relative importance of each of the programming categories.

28. A method for visually displaying the relative importance of categorical programming information on a display screen of an audio/visual (AV) system, said method comprising:

receiving a selection of a measuring value from a remote controller of the AV system in communication with a computer program that sets the measuring value; and displaying titles of a plurality of programming categories on the display screen of the AV system in a manner that visually indicates to a viewer of the display screen through one or more visual factors the relative importance of each of the programming categories of the plurality of programming categories as measured by the measuring value and determined by the computer program, said one or more visual factors being size and location.

29. The method of claim 28, wherein the titles of the plurality of programming categories are presented to the viewer in an interface box of the display screen of the AV system.

30. The method of claim 29, wherein the interface box is a graphical user interface (GUI) by which the viewer of the display screen is in communication with the computer program via the remote controller.

31. The method of claim 28, wherein the titles of the plurality of programming categories are displayed on the display screen by a computer that determines the relative importance of each of the programming categories of the plurality of programming categories as measured by the measuring value.

32. The method of claim 28, further comprising:

updating the one or more visual factors through which the titles of the plurality of programming categories are displayed on the display screen in response to a change in the selected measuring value.

33. The method of claim 28, further comprising:

receiving a selection of a programming category of the plurality of programming categories from the remote controller of the AV system; and displaying titles of the plurality of programming subcategories on the display screen of the AV system in a manner that visually indicates to a viewer of the display screen through one or more visual factors the relative importance of each of the programming subcategories of the plurality of programming subcategories as measured by the measuring value and determined by the computer program.

34. The method of claim 33, wherein the titles of the plurality of programming subcategories are presented in an interface box within the display screen.

35. The method of claim 33 further comprising:

displaying content for the plurality of programming subcategories in a manner that visually indicates the relative importance of each of the programming subcategories.

36. The method of claim 28 further comprising:

displaying content for the plurality of programming categories in a manner that visually indicates the relative importance of each of the programming categories.

37. A storage media containing a computer program for visually displaying the relative importance of categorical programming information on a display screen of an audio/visual (AV) system, comprising:

instructions for receiving a selection of a measuring value from a remote controller of the AV system in communication with a computer program that sets the measuring value; and instructions for displaying titles of a plurality of programming categories on the display screen of the AV system in a manner that visually indicates to a viewer of the display screen through one or more visual factors the relative importance of each of the programming categories of the plurality of programming categories as measured by the measuring value and determined by the computer program, said one or more visual factors being size and location.

38. The media of claim 37, further comprising:

instructions for updating the one or more visual factors through which the titles of the plurality of programming categories are displayed on the display screen in response to a change in the selected measuring value.

39. The media of claim 37, further comprising:

instructions for receiving a selection of a programming category of the plurality of programming categories from the remote controller of the AV system; and instructions for displaying titles of the plurality of programming subcategories on the display screen of the AV system in a manner that visually indicates to a viewer of the display screen through one or more visual factors the relative importance of each of the programming subcategories of the plurality of programming subcategories as measured by the measuring value and determined by the computer program.

40. The media of claim 37 further comprising:

instructions for displaying content for the plurality of programming categories in a manner that visually indicates the relative importance of each of the programming categories.

41. The media of claim 37 further comprising:

instructions for displaying content for the plurality of programming subcategories in a manner that visually indicates the relative importance of each of the programming subcategories.

42. A audio/visual (AV) semantic category display system, comprising:

a display screen;

an antenna for receiving one or more channel to be displayed on the display screen;

an integrated receiver/decoder (IRD) having a computer program that is operatively coupled to the display screen and the antenna; and a remote control device operatively coupled to the computer program of the IRD to communicate to the computer program how titles of a plurality of programming categories are to be displayed on the display screen in a manner that visually indicates to a viewer of the display screen through one or more visual factors the relative importance of each of the programming categories of the plurality of programming categories as measured by a measuring value, said one or more visual factors being size and location.

43. The system of claim 42, wherein the remote control device communicates the measuring value to the computer program.

44. The system of claim 42, wherein the titles of the plurality of programming categories are presented in an interface box within the display screen.

45. The system of claim 42, wherein the computer program operates to update the one or more visual factors through which the titles of the plurality of programming categories are displayed on the display screen in response to a change in the measuring value.

46. The system of claim 42, wherein content for the plurality of programming categories is displayed in a manner that visually indicates the relative importance of each of the programming categories.

* * * * *